US012052548B2

(12) United States Patent
Shriner et al.

(10) Patent No.: US 12,052,548 B2
(45) Date of Patent: Jul. 30, 2024

(54) HEARING INSTRUMENT AND CHARGER

(71) Applicant: Starkey Laboratories, Inc., Eden Prairie, MN (US)

(72) Inventors: Paul Anders Shriner, Hopkins, MN (US); Andrew Joseph Johnson, Edina, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 131 days.

(21) Appl. No.: 17/553,001

(22) Filed: Dec. 16, 2021

(65) Prior Publication Data

US 2022/0109941 A1 Apr. 7, 2022

Related U.S. Application Data

(63) Continuation of application No. PCT/US2020/039902, filed on Jun. 26, 2020.

(Continued)

(51) Int. Cl.

*H04R 25/00* (2006.01)
*H04R 1/02* (2006.01)
*H04R 1/10* (2006.01)

(52) U.S. Cl.

CPC .......... *H04R 25/554* (2013.01); *H04R 1/025* (2013.01); *H04R 1/1016* (2013.01); *H04R 25/55* (2013.01);

(Continued)

(58) Field of Classification Search

CPC .... H04R 1/1025; H04R 1/1016; H04R 25/55; H04R 25/554; H04R 25/556; H04R 25/602; H04R 25/603; H04R 2225/31

See application file for complete search history.

(56) References Cited

U.S. PATENT DOCUMENTS 7,497,693 B1 3/2009 Wu
8,027,497 B2 * 9/2011 Klemenz ............... H04R 25/55 381/322

(Continued)

FOREIGN PATENT DOCUMENTS

CN 109068206 A 12/2018
DE 102015203536 A1 9/2016

(Continued)

OTHER PUBLICATIONS

"Mu-metal", Wikipedia, the Free Encyclopedia, last edited on Dec. 12, 2021, accessed on Feb. 1, 2022, 4 pp.

(Continued)

*Primary Examiner* — Huyen D Le
(74) *Attorney, Agent, or Firm* — Shumaker & Sieffert, P.A.

(57) ABSTRACT

A system includes a hearing instrument and a case configured to store at least a portion of the hearing instrument. The hearing instrument includes a speaker configured to generate a sound wave, and at least one magnetic component that includes one or more of a coil configured to generate a current in response to detecting an alternating magnetic field, a magnetic shield configured to provide an electromagnetic shield for one or more components of the hearing instrument, a crosspin configured to provide a structural support between two opposing sides of the hearing instrument, a battery, or a charging contact configured to electrically couple the battery to a power source. The case includes a retention magnet configured to generate a static magnetic field that detachably couples at least the portion of the hearing instrument with the case by attracting the magnetic component of the hearing instrument to the case retention magnet.

18 Claims, 6 Drawing Sheets

Related U.S. Application Data

(60) Provisional application No. 62/866,910, filed on Jun. 26, 2019.

(52) U.S. Cl.
CPC ......... *H04R 25/556* (2013.01); *H04R 25/602* (2013.01); *H04R 25/603* (2019.05); *H04R 2225/31* (2013.01)

(56) References Cited

U.S. PATENT DOCUMENTS

| | | | | |
|---|---|---|---|---|
| 8,342,857 | B2 | 1/2013 | Palli et al. | |
| 9,210,498 | B1 | 12/2015 | Shaffer | |
| 2016/0037273 | A1 | 2/2016 | Gustafsson | |
| 2016/0134959 | A1* | 5/2016 | Shaffer | H04R 1/1025 381/74 |
| 2016/0277848 | A1* | 9/2016 | Naumann | H04R 25/30 |

FOREIGN PATENT DOCUMENTS

| | | | |
|---|---|---|---|
| EP | 1921893 | A2 | 5/2008 |
| GB | 1254017 | A | 11/1971 |

OTHER PUBLICATIONS

International Preliminary Report on Patentability from International Application No. PCT/US2020/039902, dated Jan. 6, 2022, 9 pp.
International Search Report and Written Opinion of International Application No. PCT/US2020/039902, dated Sep. 16, 2020, 15 pp.
Lai, "Blamey Saunders introduces 3D designed world first hearing aid", 3D Printing Industry, Mar. 14, 2018, 3 pp.
Communication pursuant to Article 94(3) EPC from counterpart European Application No. 20740774.3 dated Dec. 20, 2023, 4 pp.
Response to Communication pursuant to Article 94(3) EPC dated Dec. 20, 2023, from counterpart European Application No. 20740774.3 filed Apr. 15, 2024, 8 pp.

* cited by examiner

HEARING INSTRUMENT AND CHARGER

This patent application is a continuation of International Application No. PCT/US2020/039902, filed Jun. 26, 2020, which claims the benefit of U.S. Provisional Patent Application No. 62/866,910, filed Jun. 26, 2019, the entire content of both of which are incorporated herein by reference.

TECHNICAL FIELD

This disclosure relates to hearing instruments.

BACKGROUND

A hearing instrument is a device designed to be worn on, in, or near one or more of a user's ears. Example types of hearing instruments include hearing aids, earphones, earbuds, telephone earpieces, cochlear implants, and other types of devices. Hearing instruments typically include rechargeable batteries. Hearing instruments often include a dedicated magnet to couple the hearing instrument to a case, such as a charging case. The dedicated magnet may require additional space within the hearing instrument and may add cost to the hearing instrument.

SUMMARY

In general, this disclosure describes techniques for coupling a hearing instrument to a case for carrying the hearing instrument. In one example, the case includes a retention magnet. The hearing instrument includes one or more magnetic components that perform dual functions. Examples of the magnetic components include a coil configured to generate a current in response to detecting an alternating magnetic field, a magnetic shield configured to provide an electromagnetic shield for one or more components of the hearing instrument, a cross-pin configured to provide a structural support between two opposing sides of the hearing instrument, a battery configured to store energy, a charging contact configured to electrically couple the battery to a power source, among others. The one or more magnetic components perform a second function associated with coupling at least a portion of the hearing instrument with the case. For example, the magnetic components may magnetically interact with a magnetic field generated by the retention magnet to magnetically couple at least a portion of the hearing instrument to the case. By utilizing magnetic components that perform dual functionality, the magnetic components may securely couple the hearing instrument to the case without utilizing a single purpose dedicated permanent magnet to secure the hearing instrument to the case. Utilizing a magnetic component that performs dual functions, rather than utilizing a dedicated permanent magnet, may reduce the size or cost of the hearing instrument, or may enable the hearing instrument to include a bigger battery or additional components, such as one or more sensors.

In one example, a system includes a hearing instrument and a case configured to store at least a portion of the hearing instrument. The hearing instrument includes a speaker configured to generate a sound wave, and at least one magnetic component comprising one or more of a coil configured to generate a current in response to detecting an alternating magnetic field, a magnetic shield configured to provide an electromagnetic shield for one or more components of the hearing instrument, a cross-pin configured to provide a structural support between two opposing sides of the hearing instrument, a battery, or a charging contact configured to electrically couple the battery to a power source. The case includes a retention magnet configured to generate a static magnetic field that detachably couples at least the portion of the hearing instrument with the case by attracting the magnetic component of the hearing instrument to the retention magnet of the case.

In another example, a device is configured to store at least a portion of a hearing instrument. The device includes a housing; a retention structure; and a retention magnet configured to generate a static magnetic field that detachably couples at least the portion of the hearing instrument with the housing by attracting a magnetic component of the hearing instrument to the retention magnet of the case. A shape of the retention structure complements a shape of the portion of the hearing instrument. The shape of the portion of the hearing instrument aligns with the shape of the retention structure when the portion of the hearing instrument mates with the retention structure. A magnitude of the static magnetic field at a location of a magnetic component of the hearing instrument satisfies a threshold magnitude for magnetically coupling the portion of the hearing instrument to the housing when the portion of the hearing instrument mates with the retention structure.

In yet another example, a hearing instrument includes a speaker configured to generate a sound wave and a magnetic component configured to generate a signal indicative of the sound wave in response to detecting an alternating magnetic field or to provide an electromagnetic shield for one or more components of the hearing instrument. A shape of a portion of the hearing instrument complements a shape of a retention structure of a case configured to store at least the portion of the hearing instrument. The shape of the portion of the hearing instrument aligns with the shape of the retention structure when the portion of the hearing instrument mates with the retention structure. The magnetic component magnetically couples to a retention magnet of the case when the portion of the hearing instrument mates with the retention structure.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
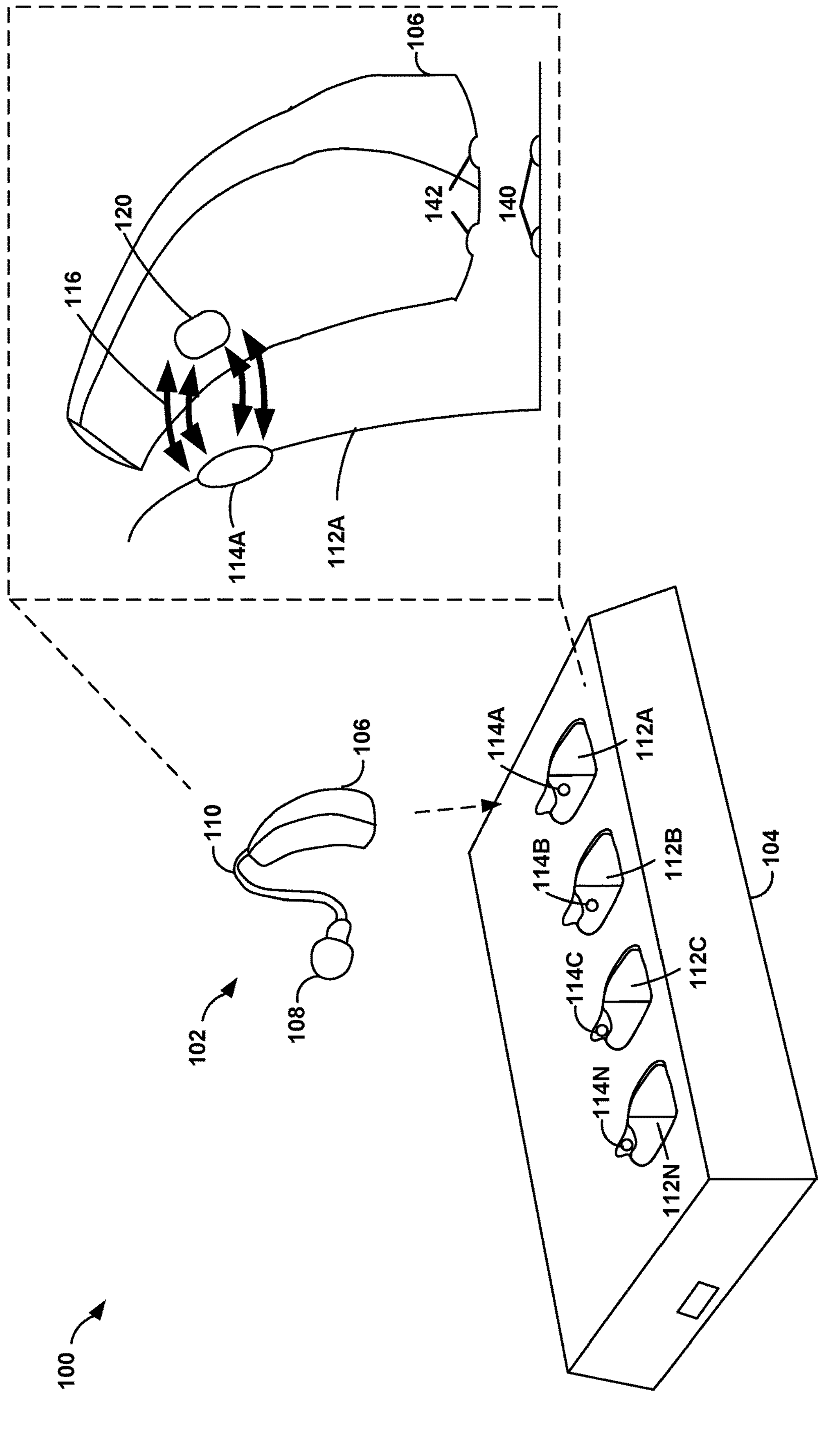
FIG. 1 is a conceptual diagram illustrating an example hearing instrument system, in accordance with one or more aspects of the present disclosure.

FIG. 1 is a conceptual diagram illustrating an example hearing instrument system 100, in accordance with one or more aspects of the present disclosure. Hearing instrument system 100 of FIG. 1 includes a hearing instrument 102 and a case 104. It should be understood that system 100 is only one example of a hearing instrument system according to the described techniques. Hearing instrument system 100 may include additional or fewer components than those shown in FIG. 1.

Hearing instrument 102 is configured to cause auditory stimulation of a user. For example, hearing instrument 102 may be configured to output sound. As another example, hearing instrument 102 may include an external portion of a cochlear implant system, where the cochlear implant system stimulates a cochlear nerve of a user and where hearing instrument is configured to reside external to a patient or user's body. As the term is used herein, a hearing instrument may refer to a hearing instrument that is used as a hearing aid, a personal sound amplification product (PSAP), a headphone set, a hearable, a wired or wireless earbud, a cochlear implant system (which may include cochlear implant magnets, cochlear implant transducers, and cochlear implant processors), or another type of device that provides auditory stimulation to a user. In some instances, hearing instruments 102 may be worn. For instance, a single hearing instrument 102 may be worn by a user (e.g., with unilateral hearing loss). In another instance, two hearing instruments, such as hearing instrument 102, may be worn by the user (e.g., with bilateral hearing loss) with one instrument in each ear. In some examples, hearing instruments 102 are implanted on the user (e.g., a cochlear implant that is implanted within the ear canal of the user). The described techniques are applicable to any hearing instruments that provide auditory stimulation to a user.

In some examples, hearing instrument 102 is a hearing assistance device. In general, there are three types of hearing assistance devices. A first type of hearing assistance device includes a housing or shell that is designed to be worn in the ear for both aesthetic and functional reasons. The housing or shell encloses the electronic components of the hearing instrument. Such devices may be referred to as in-the-ear (ITE), in-the-canal (ITC), completely-in-the-canal (CIC), or invisible-in-the-canal (IIC) hearing instruments. Some in-the-ear hearing instruments have limited capabilities due to their small size and limited volume for housing electronics and power sources.

A second type of hearing assistance device, referred to as a behind-the-ear (BTE) hearing instrument, includes a housing worn behind the ear. The housing may contain all of the electronic components of the hearing instrument, including a receiver (i.e., a speaker). An audio tube conducts sound generated by the receiver to an earbud inside the ear.

A third type of hearing assistance device, referred to as a receiver-in-canal (RIC) hearing instrument, has a housing worn behind the ear that contains electronic components, but does not contain the receiver, which is worn in the ear canal. The behind-the-ear portion of a RIC hearing instrument is electrically connected to the receiver worn in the ear canal.

In the example of FIG. 1, hearing instrument 102 includes a behind-ear portion 106, an in-ear portion 108, and a tether 110. In operation, behind-ear portion 106, in-ear portion 108, and tether 110 are physically and operatively coupled together to provide sound to a user for hearing. Behind-ear portion 106 and in-ear portion 108 may each be contained within a respective housing or shell. The housing or shell of behind-ear portion 106 allows a user to place behind-ear portion 106 behind his or her ear, whereas the housing or shell of in-ear portion 108 is shaped to allow a user to insert in-ear portion 108 within his or her ear canal. Electronic components of hearing instrument 102 may be included in one or more of behind-ear portion 106 or in-ear portion 108.

In-ear portion 108 is mainly used by hearing instrument 102 for sound amplification and for outputting the amplified sound via an internal speaker (also referred to as a receiver) to a user's ear. In some examples, in-ear portion 108 converts an electrical signal from behind-ear portion 106 into a sound wave. In some examples, behind-ear portion 106 generates a sound wave and tether 110 may guide the sound wave from behind-ear portion 106 to in-ear portion 108, which may guide the sound wave into the user's ear.

Behind-ear portion 106 is configured to contain a rechargeable or non-rechargeable power source that provides electrical power, via tether 110, to in-ear portion 108. In some examples, in-ear portion 108 includes its own power source, and behind-ear portion 106 supplements the power source of in-ear portion 108.

Behind-ear portion 106 may include various other components in addition to a rechargeable power source. For example, behind-ear portion 106 may include a radio or other communication unit to serve as a communication link or communication gateway between hearing instrument 102 and the outside world. Such a radio may be a multi-mode radio or a software-defined radio configured to communicate via various communication protocols. That is, behind-ear portion 106 may include communication components for communicating via a network on behalf of hearing instrument 102 or for communicating directly with other hearing assistance devices.

Tether 110 forms one or more electrical links that operatively and communicatively couple behind-ear portion 106 to in-ear portion 108. Tether 110 may be configured to wrap from behind-ear portion 106 (e.g., when behind-ear portion 106 is positioned behind a user's ear) above, below, or around a user's ear, to in-ear portion 108 (e.g., when in-ear portion 108 is located inside the user's ear canal). When physically coupled to in-ear portion 108 and behind-ear portion 106, tether 110 is configured to transmit electrical power from behind-ear portion 106 to in-ear portion 108. Tether 110 may be configured to exchange data between portions 106 and 108, for example, via one or more sets of electrical wires.

Case 104 is configured to store one or more behind-ear portions 106 of hearing instrument 102. In some examples, case 104 is configured to charge one or more power sources (e.g., a rechargeable battery, a capacitor, etc.) of behind-ear portion 106 when behind-ear portion 106 is detachably coupled to case 104. In some examples, case 104 may be configured to store (and optionally charge) multiple behind-ear portions of an example hearing assistance device, such as behind-ear portions 106 of hearing instrument 102.

Case 104 may be a portable case. In some examples, case 104 may come in a variety of different shapes and sizes that are suitable for carrying in a person's hand, securing to a person's body, or stowing in a clothes pocket or other secure location. In some examples, case 104 may be approximately four cubic inches or less. For instance, case 104 may be two inches wide by two inches tall, by three quarter inches deep, as one example. In some examples, a volume of case 104 may be greater than four cubic inches or less. For instance, case 104 may be three inches wide by two or three inches tall, by one inch deep, as one example. One dimension (e.g., height, width, or depth) may be decreased to accommodate an increase in another dimension to cause case 104 to have a different shape, without increasing volume or sacrificing portability. For instance, case 104 may be one and a half inches tall by one and a half inches wide by two inches deep, as one example. In other examples, case 104 may be spherical, cylindrical, conical, or have some other shape. For example, case 104 may be a four-inch diameter disk shape that is a half inch thick.

In some cases, case 104 is configured to retain only behind-ear portions 106 of hearing instrument 102 during storing and/or charging and not retain tether 110 and/or in-ear portion 108 during storing and charging. In this way, case 104 may conveniently provide a way for a user to swap out one behind-ear portion 106 for a different behind-ear portion 106 without having to swap out in-ear portion 108. Such a configuration may provide a more convenient user experience and may also help ensure case 104 and behind-ear portions 106 (which do not enter a user's ear canal and are therefore less susceptible to contaminants from regular use) remain clean and sanitary. In addition, by retaining only behind-ear portions 106, the overall size of case 104 can be reduced by an amount at least proportional to a size of in-ear portion 108. In addition, in-ear portion 108 may be used by itself providing additional benefits. That is, hearing aid wearers sometimes feel stigmatized by having to wear a device which reveals their handicap. Thus, it may be convenient for a wearer to sometimes remove behind-ear portions 106 to better conceal hearing instrument 102 by only having to wear in-ear portion 108.

Of course, in other examples, case 104 is configured to retain all of hearing instrument 102 during storing and/or charging. For example, case 104 may accommodate each of behind-ear portions 106, tether 110, and in-ear portion 108 simultaneously, for example, when a user is sleeping or traveling, case 104 may be configured to retain each part of hearing instrument 102.

As shown in FIG. 1, case 104 includes one or more retention structures 112A-112N (collectively "retention structures 112"). Each of retention structures 112 is configured to retain an individual portion of an example hearing instrument, such as behind-ear portion 106 of hearing instrument 102. As used herein, the term "retention structure" applies to a cavity, a hole, an aperture, a recess, a groove, a slot, or a space inside a retaining wall of a housing. In some examples, rather than insert behind ear portions 106 inside retention structures 112, behind-ear portions 106 may be inserted atop, or next to, retention structures 112. In other words, while described primarily as holding or retaining behind-ear portions 106, in some cases, retention structures 112 simply receive (but not necessarily tightly hold) behind-ear portions 106.

Case 104 may include any quantity of retention structures 112. In some cases, case 104 includes four retention structures 112 so that at least a first pair of hearing instruments 102 may be fully charged while a second pair is charging and a user is wearing a third pair of hearing instruments 102. In some cases, case 104 includes two retention structures 112 for charging and storing a single pair of hearing instruments 102. In other cases, case 104 includes three or more retention structures 112 for storing extra behind-ear portions 106.

Retention structures 112 may be configured to charge one or more rechargeable power sources (e.g., a rechargeable battery, a capacitor, etc.) contained inside each of behind-ear portions 106. For example, charging circuitry of case 104 (not shown in FIG. 1) is configured to charge the power source of behind-ear portion 106 when behind-ear portion 106 is placed inside retention structure 112A. Retention structures 112 may be mechanical components that receive one or more electrical connections (pins, pads, leafs, nodes, etc.) that contact corresponding electrical connections of behind-ear portion 106. In some cases, no physical contact between the electrical connections of retention structures 112 and behind-ear portion 106 are necessary; retention structures 112 may instead be inductively coupled to behind-ear portion 106 for charging the power source or otherwise exchanging electrical signals.

Behind-ear portion 106 is designed to be user-friendly, particularly for someone with impaired finger dexterity or who struggles with changing batteries in traditional hearing aids. Behind-ear portion 106 may be designed such that, when depleted of electrical energy, a user does not need to remove the rechargeable power source from inside the housing of behind-ear portion 106 to charge the power source. A user may find that gripping a behind-ear portion 106 is easier than holding a traditional, hearing aid battery due to behind-ear portion 106 having a larger, more manageable size.

In some examples, behind-ear portion 106 may each include one or more external charging contacts 142 (also referred to as external contacts 142, or simply contacts 142) configured to electrically couple the battery of behind-ear portion 106 to a power source (e.g., case 104). External contacts 142 may be configured to mate with a respective set of charging contacts 140 located in any one of retention structures 112 when charging. That is, external contacts 142 are configured to physically couple to charging contacts 140 to charge a battery of behind-ear portion 106. The contacts 142 of behind-ear portion 106 may also be configured to mate with electrical terminals located at one end of tether 110 when being worn. The contacts 142 may be exposed male bumps or plugs that mate into female sockets or the contacts may be exposed females sockets that mate over male bumps or plugs.

In the example of FIG. 1, each of retention structures 112 includes at least one retention magnet 114A-114N (collectively, retention magnets 114). Retention magnets 114 may detachably couple at least a portion of hearing instrument 102 and case 104 by attracting a magnetic component of hearing instrument 102 to a retention magnet of retention magnets 114 of case 104. In one example, retention magnets 114 detachably couple behind-ear portion 106 and case 104. Retention magnets 114 may be disposed in different locations within case 104. For example, as shown in the example of FIG. 1, retention magnets 114A and 114B are attached to a side wall of retention structures 112A and 112B, respectively. In the example of FIG. 1, retention magnets 114C and 114N are attached to a notch of retention structures 112C and 112N, respectively.

Behind-ear portion 106 of hearing instrument 102 includes one or more magnetic components 120. In some examples, magnetic components 120 include a ferromagnetic metal. Examples of magnetic components 120 include coils (such as a telecoil, a near field magnetic induction (NFMI) coil, or a wireless charging coil), a magnetic shield (e.g., a receiver can), a cross-pin, a battery, or a charging contact (e.g., external contacts 142). In one example, a magnetic shield may include a ferromagnetic material or alloy, such as Mu-metal.

In some examples, one or more of magnetic components 120 are configured to perform a first function and a second function. For example, a coil (e.g., an NFMI coil, telecoil, or wireless charging coil) may perform a first function by outputting a current in response to detecting an alternating magnetic field. As one example, the current may represent or be indicative of a sound wave. That is, a telecoil or NFMI coil may be configured to output a current indicative of a sound wave to additional electronics, such as a receiver (i.e., speaker) or digital signal processor (DSP), in response to detecting the alternating magnetic field. In another example, an NFMI coil may be configured to output a current indicative of a data command from another computing device, such as another hearing instrument.

As another example, a magnetic shield is configured to perform a first function by being configured to shield one or more components of hearing instrument 102 (e.g., antennas or coils) from electromagnetic energy, such as radio frequency (RF) radiation or energy emitted by a receiver (e.g., a speaker) of behind-ear portion 106 or electromagnetic radiation emitted by an integrated circuit. In yet another example, a cross-pin is configured to provide structural support between two opposing sides of a housing of behind-ear portion 106 (e.g., to help prevent the opposing sides from collapsing in towards each other). In yet another example, a battery is configured to store energy.

In some examples, magnetic components 120 perform a second function by magnetically coupling behind-ear portion 106 to one of retention magnets 114. That is, in contrast to examples where behind-ear portion 106 includes a permanent magnet configured to physically couple to a retention magnet 112 a permanent magnet of behind-ear portion 106, in some examples, behind-ear portion 106 may not include a permanent magnet. Rather, in the example of FIG. 1, retention magnet 114 is configured to magnetically couple retention magnet 114 to a magnetic component 120 of behind-ear portion 106. For example, retention magnet 114 may generate a static magnetic field 116 that attracts magnetic component 120 to physically couple behind-ear portion 106 to retention structure 112A of case 104. In such examples, the shape of behind-ear portion 106 and the shape of retention structure 112, and the location of retention magnet 112, are selected such that the magnetic field generated by retention magnet 114A interacts with magnetic component 120 to physically couple behind-ear portion 106 to retention structure 112A and hold behind-ear portion 106 firmly in-place.

While retention structures 112 are described as holding behind-ear portion 106, in some examples, case 104 may include one or more retention structures configured to hold or store tether 110, in-ear portion 108, or both. In one example, in-ear portion 108 may include a magnetic component. In this example, case 104 and in-ear portion 108 may be configured such that the magnetic component of in-ear portion 108 magnetically couples to a retention magnet within case 104. For example, hearing instrument 102 may include a RIC type device and an in-ear portion of the RIC type device may include a receiver (e.g., speaker) and a magnetic shield configured to shield components of the in-ear portion for electromagnetic energy, such as RF energy emitted by the receiver. In such examples, one or more retention structures include a retention magnet configured to magnetically interact with the magnetic shield of the in-ear portion to physically and magnetically couple the in-ear portion to case 104.

In this way, case 104 may be configured to magnetically couple to magnetic components 120 of hearing instrument 102. Utilizing magnetic components 120 to magnetically couple case 104 and hearing instrument 102 rather than a permanent magnet dedicated solely to coupling to a retention magnet 114 may enable hearing instrument 102 to be smaller, or may enable space that would otherwise be occupied by the permanent magnet to be utilized for other purposes, such as one or more sensors and/or a bigger battery.

FIGS. 2A, 2B, 2C, and 2D are conceptual diagrams illustrating example hearing instrument systems, in accordance with one or more aspects of the present disclosure. FIGS. 2A through 2D are described in the context of system 100 of FIG. 1. For instance, case 204A-204D (collectively, cases 204), retention structures 212A-212D (collectively, retention structures 212), retention magnets 214A-214D (collectively, retention magnets 214), and behind-ear portions 206 may be examples of case 104, retention structures 112, retention magnets 114, and behind-ear portion 106 of FIG. 1, respectively. Retention structures 212 are configured to receive behind-ear portion 206 of a hearing instrument. That is, in some examples, retentions structures 212 and behind-ear portion 206 are complementarily shaped such that behind-ear portion 206 mates with retention structures 212.

In the example of FIGS. 2A-2D, behind-ear portion 206 includes a plurality of magnetic components, such as a cross-pin, a charging contact, magnetic shield 220, NFMI coil 222, telecoil 224, and/or battery 226. In one example, one or more of magnetic shield 220, NFMI coil 222, telecoil 224, or battery 226 are configured to perform two different functions. In one example, magnetic shield 220 may be configured to perform a first function by being configured to shield one or more components of behind-ear portion 206 from electromagnetic energy emitted by a receiver (e.g., a speaker). In another example, NFMI coil 222 and telecoil 224 are each configured to perform a first function by outputting a current indicative of a sound wave in response to detecting an alternating magnetic field. Battery 226 may perform a first function by storing energy.

In some examples, one or more of magnetic shield 220, NFMI coil 222, and telecoil 224 are configured to perform a second function by magnetically coupling behind-ear portion 206 to a retention magnet 214. For example, behind-ear portion 206 may not include a permanent magnet to couple behind-ear portion 206 to retention structures 212. Rather, the magnetic components of behind-ear portion 206 and retention structures 212 may be configured such that a static magnetic field generated by retention magnets 214 attracts the magnetic components of behind-ear portion 206 to retention magnets 214 to physically couple behind-ear portion 206 to retention structures 212.

Figure 2B:
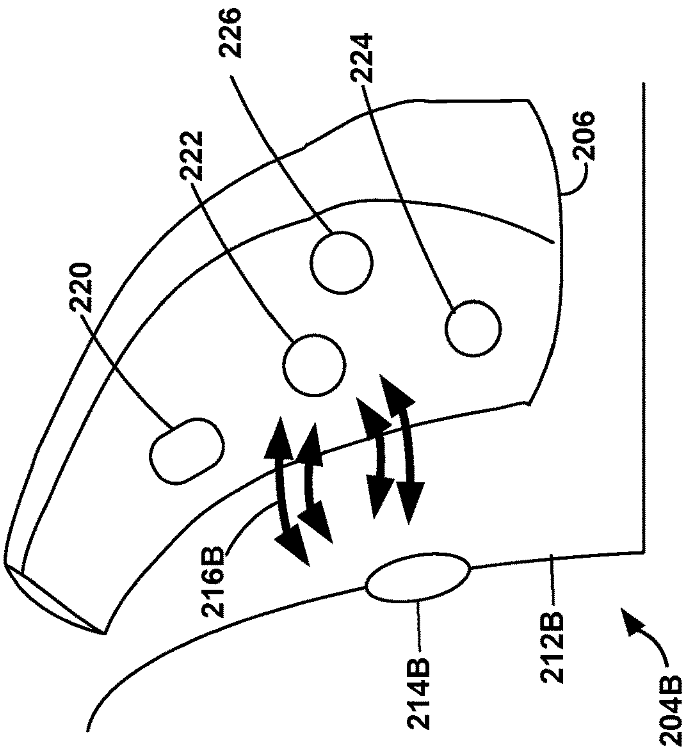
FIGS. 2A, 2B, 2C, and 2D are conceptual diagrams illustrating an example hearing assistance system, in accordance with one or more aspects of the present disclosure.
Figure 2A:
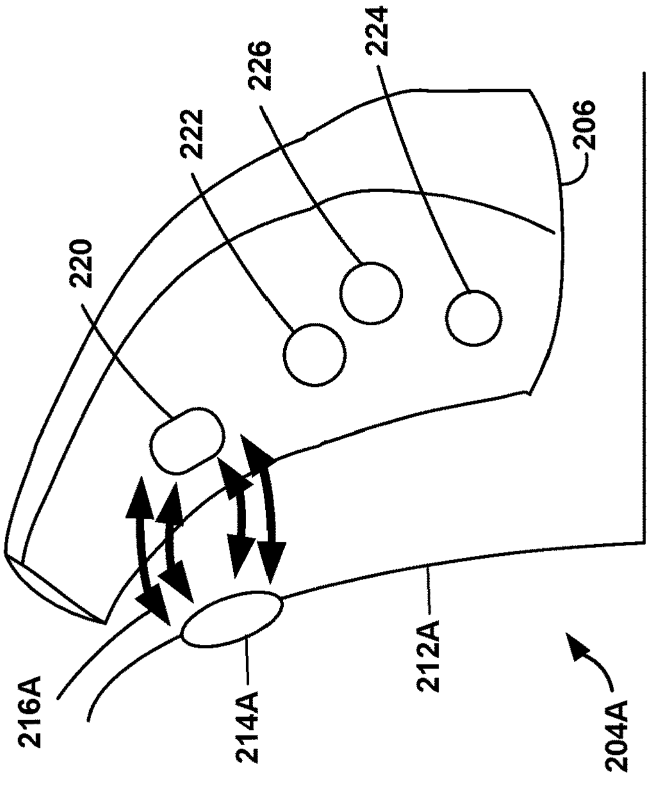

As illustrated in FIG. 2A, case 204A and behind-ear portion 206 are configured to magnetically couple magnetic shield 220 and retention magnet 214A. Retention magnet 214A generates a static magnetic field 216A. Retention magnet 214A is positioned such that the magnitude of static magnetic field 216A present at magnetic shield 220 satisfies (e.g., is greater than or equal to) a threshold magnitude for physically coupling behind-ear portion 206 to case 204A. In other words, the strength of static magnetic field 216A at the location of magnetic shield 220 is sufficiently strong to attract and physically couple behind-ear portion 206 to case 204A. In this way, retention magnet 214A is positioned such that, when behind-ear portion 206 and retention structure 212A mate (e.g., the complimentary shapes align with one another), static magnetic field 216A interacts with magnetic shield 220 to hold behind-ear portion 206 firmly in place within case 204A.

In the example of FIG. 2B, case 204B and behind-ear portion 206 are configured to magnetically couple NFMI coil 222 and retention magnet 214B via a static magnetic field 216B. That is, retention magnet 214B is positioned such that the magnitude of static magnetic field 216B present at NFMI coil 222 satisfies a threshold magnitude for physically coupling behind-ear portion 206 to case 204B when behind-ear portion 206 and retention structure 212B mate. In other words, the strength or magnetic force of static magnetic field 216B at the location of NFMI coil 222 is sufficiently strong to attract and physically couple behind-ear portion 206 to case 204B. Said another way, retention structure 212B is shaped to receive and store behind-ear portion 206 and retention magnet 214B is positioned such that static magnetic field 216B interacts with NFMI coil 222 to hold behind-ear portion 206 firmly in place within case 204B.

Figure 2D:
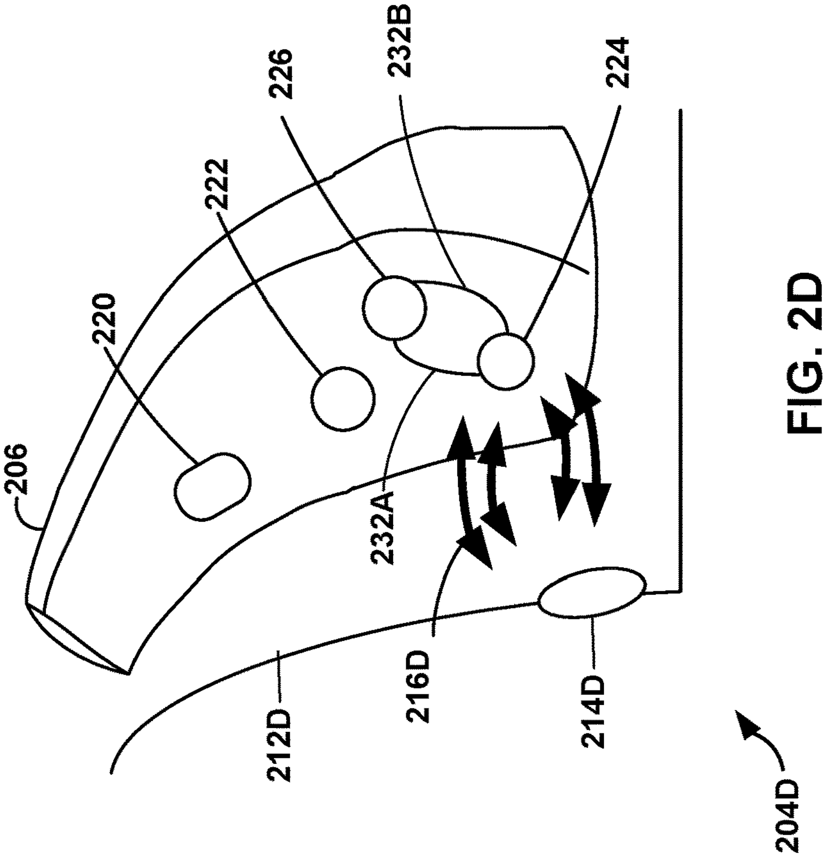
Figure 2C:
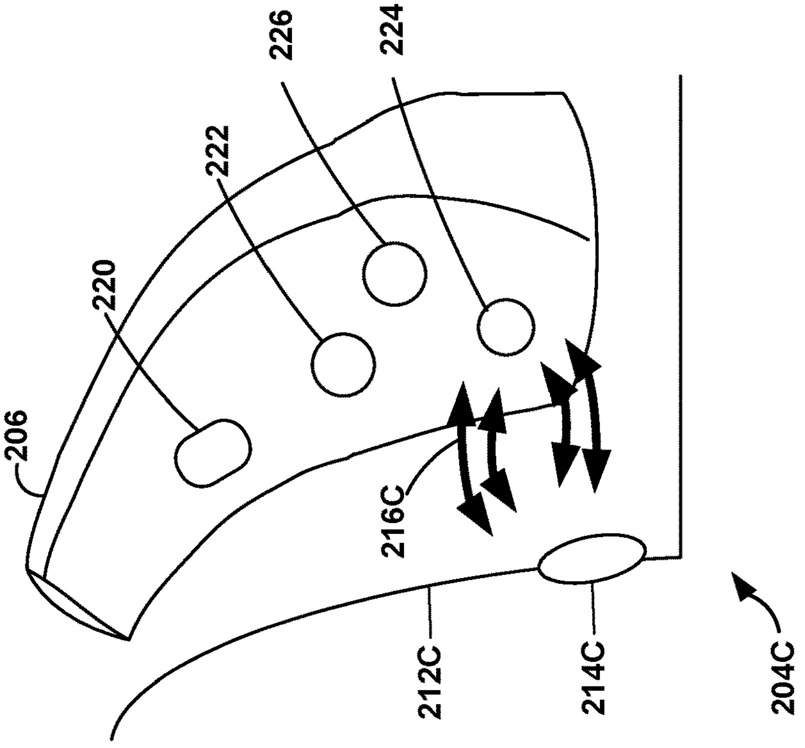

As shown in FIG. 2C, case 204C and behind-ear portion 206 are configured to magnetically couple telecoil 224 and retention magnet 214C. Retention magnet 214C generates a static magnetic field 216C. Retention magnet 214C is positioned such that a magnitude of static magnetic field 216C at the location of telecoil 224 satisfies a threshold magnitude for physically coupling behind-ear portion 206 to case 204C. That is, the strength of static magnetic field 216C present at telecoil 224 is sufficiently strong to attract and physically couple behind-ear portion 206 to retention magnet 212C. Thus, when behind-ear portion 206 mates with retention structure 212C (e.g., when the complementary shapes of behind-ear portion 20 and retention structure 212C are aligned), static magnetic field 216C interacts with telecoil 224 to hold behind-ear portion 206 firmly in place within case 204C.

In some examples, a coil of behind-ear portion 206 may act as an electromagnet to strengthen the magnetic coupling between behind-ear portion 206 and a case, such as case 206D of FIG. 2D. For example, a battery 226 may be selectively coupled to a coil (e.g., a charging coil, NFMI coil, or telecoil 224) to create an electromagnet. In the example illustrated in FIG. 2D, battery 226 is selectively coupled to telecoil 224 via conductors 232A and 232B (collectively, conductors 232). Behind-ear portion 206 may include a switching circuit configured to selectively couple battery 226 and telecoil 224. When battery 226 is coupled to telecoil 224, battery 226 may induce a current through conductors 232 and telecoil 224 and thereby create a static magnetic field. In the example of FIG. 2D, retention magnet 214D is positioned such that, when behind-ear portion 206 mates with retention structure 212D, static magnetic field 216D generated by retention magnet 214D interacts with the static magnetic field generated by telecoil 224 to attract behind-ear component 206 to retention magnet 214D. Inducing a current through telecoil 224 may increase the strength of the magnetic coupling between behind-ear portion 206 and retention magnet 214D, thereby potentially holding behind-ear portion 206 in place more firmly when behind-ear portion 206 is placed within retention structure 212D.

Figure 3A:
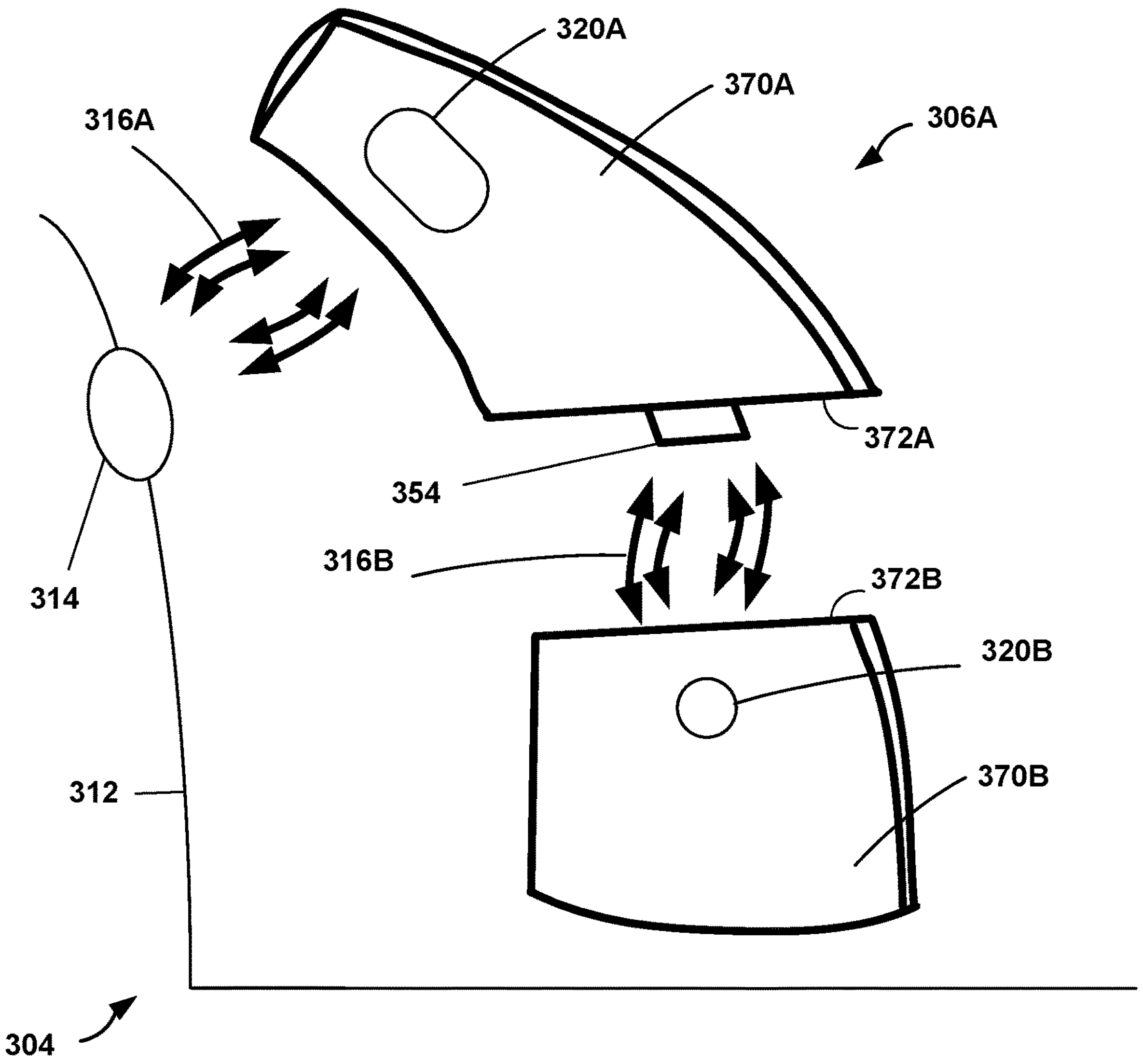
FIGS. 3A and 3B are conceptual diagrams illustrating example behind-ear portions of an example hearing instrument, in accordance with one or more aspects of the present disclosure.
Figure 3B:
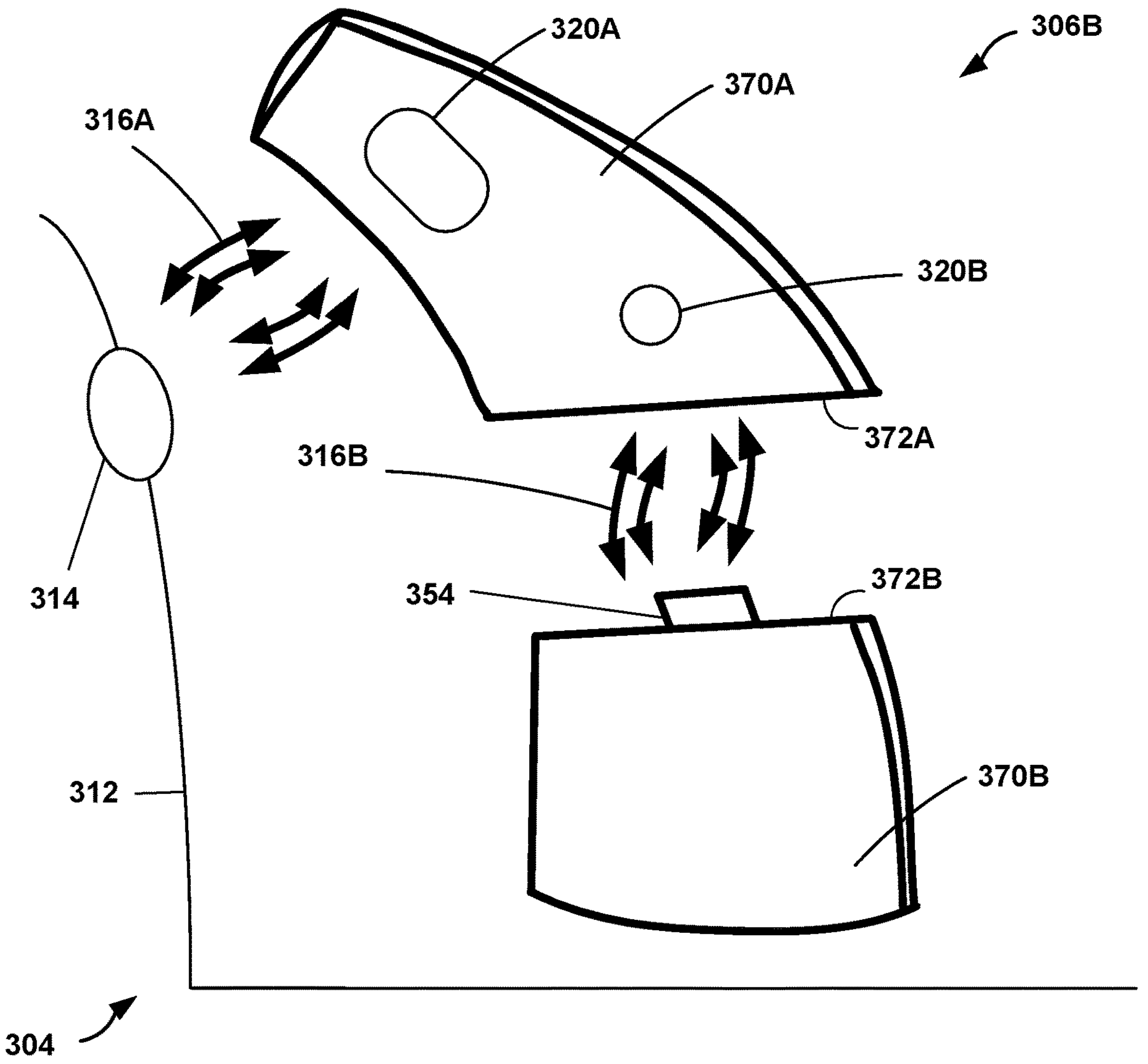

FIGS. 3A and 3B are conceptual diagrams illustrating example behind-ear portions of an example hearing instrument, in accordance with one or more aspects of the present disclosure. Behind-ear portions 306A and 306B of FIGS. 3A and 3B, respectively, are examples of behind-ear portion 106 of FIG. 1. Similarly, case 304, retention structure 312, and retention magnets 314 are examples of case 104, retention structures 112, of retention magnets 114 of FIG. 1, respectively. Retention structures 312 are configured to receive behind-ear portions 306 of a hearing instrument. That is, in some examples, retentions structures 312 and behind-ear portions 306 are complementarily shaped such that behind-ear portions 306 mates with retention structures 312

In the example of FIGS. 3A-3B, behind-ear portions 306 are modular. For example, behind-ear portions 306 each include a plurality of sub-portions 370A and 370B (collectively, sub-portions 370). Sub-portions 370 are physically separable from one another. Although each of behind-ear portions 306A and 306B is shown as having two separate sub-portions 370, in other examples, behind-ear portions 306A and 306B have a different number of sub-portions. Examples of sub-portions 370 include various power sources, radio modules, sensor modules, output components, input components, and other types of components of behind-ear portion 306.

Behind-ear portions 306 include a plurality of magnetic components 320A-320B (collectively, magnetic components 320) and a permanent magnet 354. Examples of magnetic components 320 include a magnetic shield, a coil (e.g., an NFMI coil, a telecoil, or a wireless charging coil), a cross-pin, a battery, or a charging contact. Magnetic components 320 are configured to perform two different functions. For example, an magnetic shield may be configured to perform a first function by being configured to shield one or more components of behind-ear portions 306 from electromagnetic energy emitted by one or more components of behind-ear portion 306, such as RF radiation emitted by a receiver (e.g., a speaker) or electromagnetic energy emitted by an integrated circuit. In another example, an NFMI coil and a telecoil are each configured to perform a first function by outputting a current indicative of a sound wave in response to detecting an alternating magnetic field. Magnetic components 320 are configured to perform a second function by magnetically coupling a portion of behind-ear portions 306 to another device, such as a retention magnet 314 of case 304 or permanent magnet 354 of behind-ear portions 306.

Case 304 and sub-portion 370A of behind-ear portion 306 are configured to magnetically couple to one another. For example, retention magnet 314 generates static magnetic field 316A. As illustrated in FIG. 3A, the magnitude of static magnetic field 316A at magnetic component 320A satisfies (e.g., is at least) a threshold magnitude for physically coupling case 304 and sub-portion 370A of behind-ear portion 306. In other words, retention magnet 214A is positioned such that, when behind-ear portion 206 and retention structure 212A mate (e.g., the complimentary shapes align with one another), the strength of static magnetic field 316A present at magnetic component 320A is strong enough to attract and physically couple sub-portion 370A of behind-ear portion 306 to case 304. In this way, the retention structure 312 is shaped to receive and store behind-ear portion 306 and the retention magnet 314 is positioned such that static magnetic field 316A interacts with magnetic component 320A to hold behind-ear portion 306 firmly in place within case 304.

Sub-portions 370A and 370B are configured to mate with one another. For example, surfaces 372A and 372B may be complementarily shaped such that sub-portions 370A and 370B align with one another when sub-portions 370A and 370B are coupled. In some examples, sub-portions 370A and 370B are configured to magnetically couple to one another.

In the example of FIG. 3A, sub-portion 370A includes permanent magnet 354. Permanent magnet 354 generates a static magnetic field 316B. The magnitude of static magnetic field 316B at magnetic component 320B satisfies (e.g., is at least) a threshold magnitude for physically coupling sub-portion 370A and sub-portion 370B to one another. In other words, when surfaces 372A and 372B are complimentarily aligned, the strength of static magnetic field 316B present at magnetic component 320B is sufficiently strong to attract and physically couple sub-portions 370A to sub-portion 370B. Said another way, static magnetic field 316B detachably couples sub-portions 370A and 370B to one another. In this way, sub-portions 370 may form a single behind-ear portion 306A and may be physically separable, which may enable a user of behind-ear portion 306A to quickly and easily replace one or both of sub-portions 370.

In some examples, sub-portions 370 are configured such that permanent magnet 354 does not magnetically interact with magnetic component 320A or retention magnet 314. In other words, when surfaces 372A and 372B are complimentarily aligned, the magnitude of static magnetic field 316B at magnetic component 320A does not satisfy (e.g., is less than) a threshold magnitude for physically coupling sub-portion 370A and sub-portion 370B to one another. Similarly, when surfaces 372A and 372B are complimentarily aligned, the magnitude of static magnetic field 316A at the location of permanent magnet 354 does not satisfy (e.g., is less than) a threshold magnitude for magnetically coupling retention magnet 314 and permanent magnet 354 to one another.

In the example of FIG. 3B, sub-portion 370A includes magnetic component 320B and sub-portion 370B includes permanent magnet 354. Static magnetic field 316B couples sub-portion 370A and sub-portion 370B to one another, as described above with reference to FIG. 3A.

Figure 4:
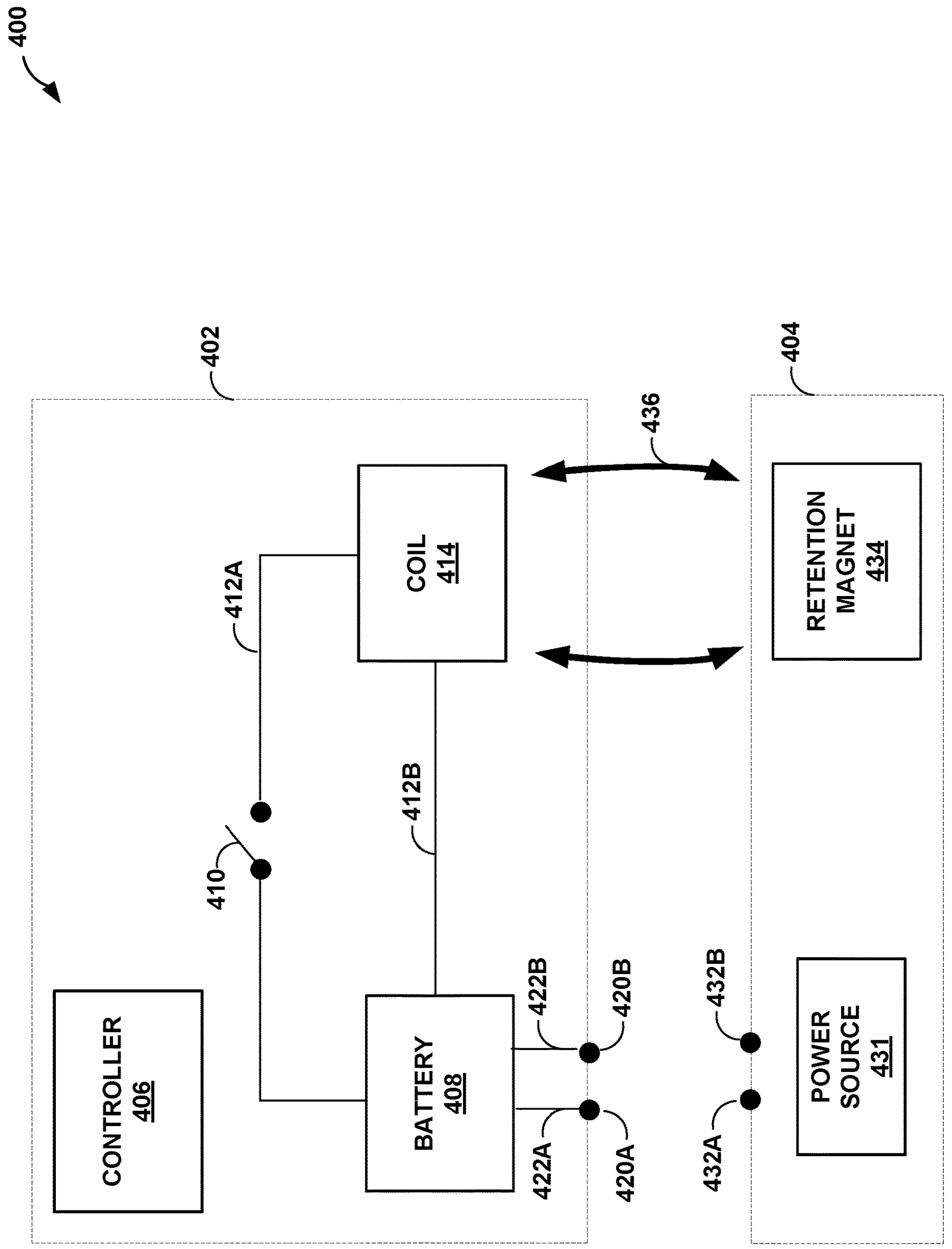
FIG. 4 is a schematic illustrating an example hearing instrument system for storing an example hearing instrument, in accordance with one or more aspects of the present disclosure.

FIG. 4 is a schematic illustrating an example hearing instrument system 400 for storing an example hearing instrument, in accordance with one or more aspects of the present disclosure. Hearing instrument 402 and case 404 are examples of hearing instrument 102 and case 104 of FIG. 1, respectively.

Case 404 includes power source 431, charging contacts 432A, 432B (collectively, charging contacts 432), and retention magnet 434. Charging contacts 432 of case 404 may physically contact contacts 420A, 420B (collectively, contacts 420) of hearing instrument 402 when hearing instrument 402 is inserted into a retention structure of case 404. In some examples, when contacts 420 and charging contacts 432 make physical contact, current flows from power source 431 to battery 408 to charge battery 408.

Hearing instrument 402 and case 404 are configured to magnetically couple to one another. In the example of FIG. 4, retention magnet 434 generates a static magnetic field 436. In some examples, hearing instrument 402 may utilize coil 414 as an electromagnet to increase the strength of the magnetic coupling between hearing instrument 402 and case 404.

Hearing instrument 402 includes a controller 406, battery 408, switch 410, conductors 412A, 412B, and coil 414. Coil 414 may include an NFMI coil or a telecoil. In some examples, controller 406 includes processing circuitry that causes coil 414 to act as an electromagnet by closing switch 410. In other words, controller 406 selectively opens and closes switch 410 to selectively generate a static magnetic field via coil 414. In this way, controller 406 may selectively create an electromagnet by closing switch 410 to electrically couple battery 408 and coil 414.

In some scenarios, controller 406 may close switch 410 in response to detecting that battery 408 is charging (e.g., by detecting a current flowing via conductors 422A, 422B from contacts 420 to battery 408). In another scenario, controller 406 may close switch 410 in response to receiving a command from case 404 (e.g., wirelessly, such as via BLUETOOTH, RFID, or NFMI) instructing controller 406 to close the switch. As another example, controller 406 may cause switch 410 to remain in a closed position (e.g., as a default) and may open switch 410 in response to detecting hearing instrument 402 is proximate the user's skin (e.g., in his/her hand or behind the ear). For instance, controller 406 may detect hearing instrument 402 is proximate the user's skin via a capacitive sensor.

Controller 406 may adjust the strength of the static magnetic field generate by coil 414. For example, controller 406 may receive a user input to adjust the static magnetic field strength, such as based on strength tests done in an audiologist's office to determine a patient's grip strength. In another example, controller 406 may adjust the strength of the magnetic field based on a machine learning algorithm. In one example, controller adjusts the magnetic field strength by adjusting a current applied to coil 414 when switch 410 is closed (e.g., when the electromagnet is "on").

In some examples, the static magnetic field generated by coil 414 interacts with the static magnetic field 436 to physically couple hearing instrument 402 and case 404. That is, retention magnet 434 is positioned within case 404 such that a static magnetic field 436 interacts with the static magnetic field generated by coil 414 to attract hearing instrument 402 to retention magnet 434.

The following is a non-limiting list of examples that are in accordance with one or more techniques of this disclosure.

Example 1A. A system comprising: a hearing instrument comprising: a speaker configured to generate a sound wave; at least one magnetic component comprising one or more of: a coil configured to generate a current in response to detecting an alternating magnetic field, a magnetic shield configured to provide an electromagnetic shield for one or more components of the hearing instrument, a cross-pin configured to provide a structural support between two opposing sides of the hearing instrument, a battery configured to store energy, or a charging contact configured to electrically couple the battery to a power source; and a case configured to store at least a portion of the hearing instrument, the case comprising a retention magnet configured to generate a static magnetic field that detachably couples at least the portion of the hearing instrument with the case by attracting the magnetic component of the hearing instrument to the retention magnet of the case.

Example 2A. The system of example 1A, wherein the magnetic component includes the coil, wherein the coil includes one or more of: a telecoil, wherein the current is indicative of the sound wave; a near-field magnetic induction (NFMI) coil, wherein the current is indicative of the sound wave or a data command; or a wireless charging coil, wherein the current charges the battery.

Example 3A. The system of any one of examples 1A-2A, wherein the magnetic component of the hearing instrument includes the coil, wherein the coil is configured to function as an electromagnet.

Example 4A. The system of example 3A, wherein the static magnetic field is a first static magnetic field, wherein the hearing instrument further comprises: a switch configured to selectively couple the coil to the battery, and wherein coupling the coil to the battery causes the coil to generate a second static magnetic field that interacts with the first static magnetic field generated by the retention magnet of the case in a way that attracts the coil of the hearing instrument to the retention magnet of the case.

Example 5A. The system of any one of examples 1A-4A, wherein the hearing instrument comprises an in-ear portion that includes the magnetic component.

Example 6A. The system of any one of examples 1A-4A, wherein the hearing instrument comprises a behind-ear portion that includes the magnetic component.

Example 7A. The system of any one of examples 1A-6A, wherein the hearing instrument includes a first charge contact and the case includes a second charge contact, wherein the first charge contact is configured to physically couple to the second charge contact to charge a battery of the hearing instrument when the portion of the hearing instrument is coupled to the case.

Example 8A. The system of any one of examples 1A-7A, wherein the magnetic component is a first magnetic component, and wherein the hearing instrument comprises: a first portion that includes the first magnetic component; a second portion physically separable from the first portion; a permanent magnet configured to generate a second static magnetic field, wherein a magnitude of the first static magnetic field generated by the retention magnet at a location of the permanent magnet is less than a threshold magnitude for magnetically coupling the retention magnet and the permanent magnet, and a second magnetic component comprising one of the coil, the magnetic shield, the cross-pin, the battery, or the charging contact; wherein a strength of the second static magnetic field generated by the permanent magnet at a location of the second magnetic component is at least a threshold magnitude for magnetically coupling the permanent magnet and the second magnetic component to physically couple the first portion of the hearing instrument to the second portion of the hearing instrument.

Example 9A. The system of example 8A, wherein the first portion of the hearing instrument includes the permanent magnet, and wherein the second portion of the hearing instrument includes the second magnetic component.

Example 10A. The system of example 8A, wherein the first portion of the hearing instrument includes the second magnetic component, and wherein the second portion of the hearing instrument includes the permanent magnet.

Example 11A. The system of any one of examples 1A-10A, wherein the case includes a retention structure, and wherein a shape of the retention structure complements a shape of the portion of the hearing instrument, and wherein the static magnetic field generated by the retention magnet detachably couples the portion of the hearing instrument with the case when the retention structure mates with the portion of the hearing instrument.

Example 12A. The system of any one of examples 1A-7A, wherein the magnetic component of the hearing instrument does not include a permanent magnet.

Example 13A. The system of any one of examples 1A-12A, wherein the case is configured to charge the battery when the portion of the hearing instrument is detachably coupled to the case.

Example 1B. A device configured to store at least a portion of a hearing instrument, the device comprising: a housing; a retention structure; and a retention magnet configured to generate a static magnetic field that detachably couples at least the portion of the hearing instrument with the case by attracting a magnetic component of the hearing instrument to the retention magnet of the housing, wherein a shape of the retention structure complements a shape of the portion of the hearing instrument, wherein the shape of the portion of the hearing instrument aligns with the shape of the retention structure when the portion of the hearing instrument mates with the retention structure, and wherein a magnitude of the static magnetic field at a location of a magnetic component of the hearing instrument satisfies a threshold magnitude for magnetically coupling the portion of the hearing instrument to the housing when the portion of the hearing instrument mates with the retention structure.

Example 2B. The device of example 2B, further comprising a first charge contact, wherein the first charge contact is configured to physically couple to a second charge contact of the hearing instrument to charge a battery of the hearing instrument when the portion of the hearing instrument mates with the retention structure.

Example 3B. The device of any one of examples 1B-2B, wherein the retention structure defines a cavity, a hole, an aperture, a recess, a groove, a slot, or a space inside a retaining wall of the housing.

Example 4B. The device of any one of examples 1B-3B, wherein the magnetic component of the hearing instrument includes one or more of: a coil configured to generate a current in response to detecting an alternating magnetic field, a magnetic shield configured to provide an electromagnetic shield for one or more components of the hearing instrument, a cross-pin configured to provide a structural support between two opposing sides of the hearing instrument, a battery, or a charging contact configured to electrically couple the battery to a power source.

Example 1C. A hearing instrument comprising: a speaker configured to generate a sound wave; at least one magnetic component comprising one or more of: a coil configured to generate a current in response to detecting an alternating magnetic field, a magnetic shield configured to provide an electromagnetic shield for one or more components of the hearing instrument, a cross-pin configured to provide a structural support between two opposing sides of the hearing instrument, a battery, or a charging contact configured to electrically couple the battery to a power source; and wherein a shape of a portion of the hearing instrument complements a shape of a retention structure of a case configured to store at least the portion of the hearing instrument, wherein the shape of the portion of the hearing instrument aligns with the shape of the retention structure when the portion of the hearing instrument mates with the retention structure, and wherein the magnetic component magnetically couples to a retention magnet of the case when the portion of the hearing instrument mates with the retention structure.

Example 2C. The hearing instrument of example 1C, wherein the magnetic component includes the coil, wherein the coil includes one or more of: a telecoil, wherein the current is indicative of the sound wave; a near-field magnetic induction (NFMI) coil, wherein the current is indicative of the sound wave or a data command; or a wireless charging coil, wherein the current charges the battery.

Example 3C. The hearing instrument of any one of examples 1C-2C, wherein the magnetic component includes the coil, the hearing instrument further comprising: the battery; and a switch configured to selectively couple the magnetic component to the battery, wherein coupling the magnetic component to the battery causes the magnetic component to generate a second static magnetic field that interacts with a first static magnetic field generated by the retention magnet of the case to increase the strength of the magnetic coupling between the magnetic component and the retention magnet.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system comprising:

a hearing instrument comprising:

a speaker configured to generate a sound wave;

a coil configured to generate a current in response to detecting an alternating magnetic field; and a switch configured to selectively couple the coil to a battery of the hearing instrument, and wherein coupling the coil to the battery causes the coil to generate a first static magnetic field; and a case configured to store at least a portion of the hearing instrument, the case comprising a retention magnet configured to generate a second static magnetic field, wherein the first static magnetic field interacts with the second static magnetic field generated by the retention magnet of the case in a way that attracts the coil to the retention magnet of the case.

2. The system of claim 1, wherein the coil includes one or more of:

a telecoil, wherein the current is indicative of the sound wave;

a near-field magnetic induction (NFMI) coil, wherein the current is indicative of the sound wave or a data command; or a wireless charging coil, wherein the current charges the battery of the hearing instrument.

3. The system of claim 1, wherein the hearing instrument comprises an in-ear portion that includes the coil.

4. The system of claim 1, wherein the hearing instrument comprises a behind-ear portion that includes the coil.

5. The system of claim 1, wherein the hearing instrument includes a first charge contact and the case includes a second charge contact, wherein the first charge contact is configured to physically couple to the second charge contact to charge the battery of the hearing instrument when the portion of the hearing instrument is coupled to the case.

6. The system of claim 1, wherein the coil is a first magnetic component, and wherein the hearing instrument comprises:

a first portion that includes the first magnetic component;

a second portion physically separable from the first portion;

a permanent magnet configured to generate a third static magnetic field, wherein a magnitude of the second static magnetic field generated by the retention magnet at a location of the permanent magnet is less than a threshold magnitude for magnetically coupling the retention magnet and the permanent magnet; and a second magnetic component comprising the coil, wherein a strength of the third static magnetic field generated by the permanent magnet at a location of the second magnetic component is at least a threshold magnitude for magnetically coupling the permanent magnet and the second magnetic component to physically couple the first portion of the hearing instrument to the second portion of the hearing instrument.

7. The system of claim 6, wherein the first portion of the hearing instrument includes the permanent magnet, and wherein the second portion of the hearing instrument includes the second magnetic component.

8. The system of claim 6, wherein the first portion of the hearing instrument includes the second magnetic component, and wherein the second portion of the hearing instrument includes the permanent magnet.

9. The system of claim 1, wherein the case includes a retention structure, and wherein a shape of the retention structure complements a shape of the portion of the hearing instrument, and wherein the second static magnetic field generated by the retention magnet detachably couples the portion of the hearing instrument with the case when the retention structure mates with the portion of the hearing instrument.

10. The system of claim 1, wherein the coil does not include a permanent magnet.

11. The system of claim 1, wherein the case is configured to charge the battery of the hearing instrument when the portion of the hearing instrument is detachably coupled to the case.

12. A device configured to store at least a portion of a hearing instrument, the device comprising:

a housing;

a retention structure; and a retention magnet configured to generate a first static magnetic field that detachably couples at least the portion of the hearing instrument with the device by attracting a coil of the hearing instrument to the retention magnet of the housing, wherein:

the coil is configured to generate a current in response to detecting an alternating magnetic field, a shape of the retention structure complements a shape of the portion of the hearing instrument, the shape of the portion of the hearing instrument aligns with the shape of the retention structure when the portion of the hearing instrument mates with the retention structure, and a magnitude of the first static magnetic field at a location of the coil satisfies a threshold magnitude for magnetically coupling the portion of the hearing instrument to the housing when the portion of the hearing instrument mates with the retention structure, wherein selectively coupling the coil to a battery of the hearing instrument via a switch causes the coil to generate a second static magnetic field that interacts with the first static magnetic field generated by the retention magnet to increase a strength of a magnetic coupling between the coil and the retention magnet.

13. The device of claim 12, further comprising a first charge contact, wherein the first charge contact is configured to physically couple to a second charge contact of the hearing instrument to charge the battery of the hearing instrument when the portion of the hearing instrument mates with the retention structure.

14. The device of claim 12, wherein the retention structure defines a cavity, a hole, an aperture, a recess, a groove, a slot, or a space inside a retaining wall of the housing.

15. A hearing instrument comprising:

a speaker configured to generate a sound wave;

a coil configured to generate a current in response to detecting an alternating magnetic field;

a battery; and a switch configured to selectively couple the coil to the battery, wherein a shape of a portion of the hearing instrument complements a shape of a retention structure of a case configured to store at least the portion of the hearing instrument, wherein the shape of the portion of the hearing instrument aligns with the shape of the retention structure when the portion of the hearing instrument mates with the retention structure, wherein the coil magnetically couples to a retention magnet of the case when the portion of the hearing instrument mates with the retention structure, wherein coupling the coil to the battery causes the coil to generate a first static magnetic field that interacts with a second static magnetic field generated by the retention magnet of the case to increase a strength of a magnetic coupling between the coil and the retention magnet.

16. The hearing instrument of claim 15, wherein the coil includes one or more of:

a telecoil, wherein the current is indicative of the sound wave;

a near-field magnetic induction (NFMI) coil, wherein the current is indicative of the sound wave or a data command; or a wireless charging coil, wherein the current charges the battery.

17. A system comprising:

a hearing instrument comprising:

a speaker configured to generate a sound wave; and a magnetic shield configured to provide an electromagnetic shield for one or more components of the hearing instrument; and a case configured to store at least a portion of the hearing instrument, the case comprising a retention magnet configured to generate a static magnetic field that detachably couples at least the portion of the hearing instrument with the case by attracting the magnetic shield of the hearing instrument to the retention magnet of the case.

18. A system comprising:

a hearing instrument comprising:

a speaker configured to generate a sound wave;

a cross-pin configured to provide a structural support between two opposing sides of the hearing instrument; and a case configured to store at least a portion of the hearing instrument, the case comprising a retention magnet configured to generate a static magnetic field that detachably couples at least the portion of the hearing instrument with the case by attracting the cross-pin of the hearing instrument to the retention magnet of the case.

* * * * *